United States Patent
Yang et al.

(10) Patent No.: US 12,223,466 B2
(45) Date of Patent: Feb. 11, 2025

(54) REAL-TIME SHELF INVENTORY AND NOTIFICATION

(71) Applicant: NCR Voyix Corporation, Atlanta, GA (US)

(72) Inventors: Qian Yang, Smyrna, GA (US); Frank Douglas Hinek, Decatur, GA (US); Brent Vance Zucker, Roswell, GA (US)

(73) Assignee: NCR Voyix Corporation, Atlanta, GA (US)

( * ) Notice: Subject to any disclaimer, the term of this patent is extended or adjusted under 35 U.S.C. 154(b) by 495 days.

(21) Appl. No.: 16/586,287

(22) Filed: Sep. 27, 2019

(65) Prior Publication Data

US 2021/0097478 A1    Apr. 1, 2021

(51) Int. Cl.
*G06Q 10/087*    (2023.01)
*G06T 7/00*    (2017.01)
*G06V 20/20*    (2022.01)

(52) U.S. Cl.
CPC ............ *G06Q 10/087* (2013.01); *G06T 7/97* (2017.01); *G06V 20/20* (2022.01); *G06T 2207/30242* (2013.01)

(58) Field of Classification Search
None
See application file for complete search history.

(56) References Cited

U.S. PATENT DOCUMENTS

| | | | |
|---|---|---|---|
| 2009/0063306 A1* | 3/2009 | Fano | G06Q 10/087 705/28 |
| 2012/0323620 A1* | 12/2012 | Hofman | G06Q 10/087 705/7.11 |
| 2017/0185951 A1* | 6/2017 | Kawashima | G06Q 10/087 |
| 2017/0193434 A1* | 7/2017 | Shah | G06V 20/10 |
| 2019/0043003 A1* | 2/2019 | Fisher | G06V 10/82 |
| 2019/0215424 A1* | 7/2019 | Adato | G06V 40/10 |
| 2019/0236531 A1* | 8/2019 | Adato | G06F 16/288 |
| 2019/0347611 A1* | 11/2019 | Fisher | G06T 7/70 |
| 2020/0019921 A1* | 1/2020 | Buibas | G06T 19/003 |
| 2020/0074402 A1* | 3/2020 | Adato | G06V 20/52 |
| 2020/0219043 A1* | 7/2020 | Talbot | G06F 16/5854 |

* cited by examiner

*Primary Examiner* — Florian M Zeender
*Assistant Examiner* — Kimberly S. Bursum
(74) *Attorney, Agent, or Firm* — Schwegman Lundberg & Woessner, P.A.

(57) ABSTRACT

Cameras capture images of shelves/displays having items. The images are processed to identify real-time item counts on the shelves and/or empty or partially empty shelves with less than a configured number of items. Notifications or messages regarding item counts and/or empty shelving conditions are sent through an Application Programming Interface (API) to consuming services in accordance with custom defined rules. In an embodiment, real-time item counts and/or empty shelving conditions are dynamically reported through the API based on on-demand requests from the consuming services.

13 Claims, 4 Drawing Sheets

REAL-TIME SHELF INVENTORY AND NOTIFICATION

BACKGROUND

Recent advancements in image processing has permitted retailers to provide a frictionless shopping experience to its consumers. In a frictionless store, an individual can check in with a store electronically, browse for items to purchase, place items in bags/carts, and exit the store without any interaction with a store agent or with a checkout station. The items that the individual possesses when leaving the store are recognized through image processing and an account associated with the individual is automatically charged for the price of the items. This allows for quick and easy shopping and is referred to as a frictionless store or frictionless shopping because the consumer does not have to interact with any agent of the store or any terminal of the store to purchase items.

However, even with these advancements item inventory on store shelving is still problematic for the industry. Typically, restocking is based on an onsite inventory management system combined with a manager's physical inspection of the store shelves. Inventory management and re-ordering of stocked goods are accurate and efficient on weekly or on monthly bases but not on daily or during a single day. Existing techniques do not address inventory shortages or shelf stocking issues in real time. Many events can occur within the store that result in deficiencies of items on the shelves of the store, which inhibit sales and customer satisfaction.

Some of these events include, item shelf inventory being depleted because items are in carts of customers within the store, customers have purchased the items recently, customers picked the items up and moved them to other locations within the store, and others. Moreover, as more and more third-party shopping services are offered to customers, this lack of real-time item shelf-inventory can result in customers ordering and paying for items only to discover when the third-party picker goes to the story shelf there are no corresponding items to fulfill a given customer's order.

Thus, there is a need for real-time item-shelf inventory and notification.

SUMMARY

In various embodiments, methods and a system for real-time shelf inventory and notification are presented.

According to an aspect, a method for real-time shelf inventory and notification is presented. A shelf of items is identified from an image. A determination is made as to whether the shelf is partially empty of the items for an item type from the image. A notification message is provided for the shelf and the item type to a service.

DETAILED DESCRIPTION

Figure 1:
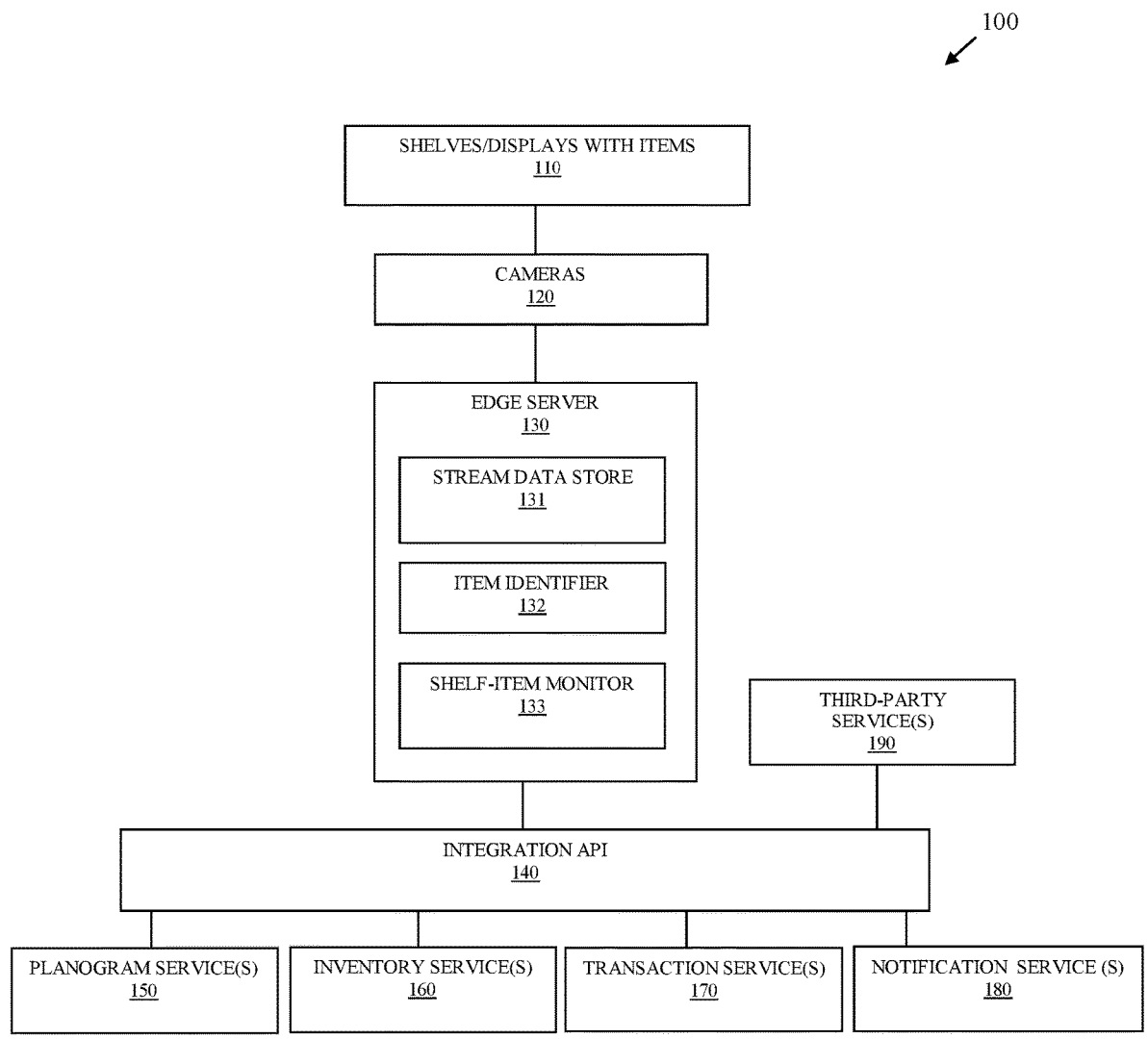
FIG. 1 is a diagram of a system for real-time shelf inventory and notification, according to an example embodiment.

FIG. 1 is a diagram of a system 100 for real-time shelf inventory and notification, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of real-time shelf inventory and notification, presented herein and below.

The system 100 includes a shelves/displays with items 110 within a store, cameras 120 that capture images items on the shelves/display. The system 100 also includes an edge server 130 local or physically on-site of the store. The server 130 includes a stream data store 131, an item identifier 132, and a shelf-item monitor 133. The system 100 further includes an integration Application Programming Interface (API) 140, planogram services 150, inventory services 160, transaction services 170, notification services 180, and third-party services 190.

Server 130 includes one or more processors and non-transitory computer-readable storage medium having executable instructions representing interfaces for accessing the stream data store 131, item identifier 132, and shelf-item monitor 133. The executable instructions when executed by the one or more processors of server 130 perform the processing discussed herein and below with respect to interfaces to data store 131, item identifier 132, and shelf-item monitor 133.

Integration API 140 represents executable instructions that may be executed by processors of server 130, an independent server, and/or any server associated with services 150-190.

Each of the services 150-190 (may also be referred to as (systems 150-190 herein) represent sets of executable instructions that are executed by processors of different servers to cause the processors to perform the processing discussed herein and below with respect to systems 150-190.

The system 100 operates from within a given retail store that includes shelves/displays 110 having items for purchase by customers. Some items may be purchased by on-line customers through third-party pickers/shoppers utilizing third-party services 190. In an embodiment, the store is a frictionless store or at least a portion of the store is frictionless. In an embodiment, the store does not include frictionless shopping systems or capabilities.

It is noted cameras 120 are configured and situated proximate to, overhead of, or on shelves/displays 110. Moreover, other cameras may be directed capture images of store aisles, entry and exits of the store, checkout areas for Self-Service checkouts, entrance to restrooms, and the stocking room.

The cameras 120 are preconfigured to capture images of the defined areas on shelves/displays 110 where items are located based on the field-of-view of the lenses of the cameras 120. Some of the cameras 120 may capture images representing portions of a different area that a different one of the cameras 120 captures images for. That is, each image can include pixel values that overlap multiple ones of the defined areas on shelves/displays 110, such that a single image includes pixel values representing different items on shelves/displays 110.

Thus, each camera lens is configured to cover one or more predefined areas of the shelves/displays 110.

Metadata is assigned to each camera 120 to include a unique camera identifier, a location identifier (representing the physical location that the camera 120 is situated within store, and one or more area identifiers (that map to the predefined areas on particular shelves/displays 110 that the lens of the camera 120 captures in the images. Each camera 120 provides time stamp and frame stamped images to unique identify a date and time of day and particular image frame within a stream of image frames.

These images are streamed as captured over a wired or wireless connection between the cameras 120 and the server 130 to a stream data store 131 on the server 130 that is accessible to the item identifier 132 and/or the shelf-item monitor 133. In an embodiment, some of the images when streamed from the cameras 120 can be buffered or cached in memory of cache and made accessible from the memory or cache directly to item identifier 132 and/or shelf-item monitor 133.

Each accessible image includes its metadata (minimally including what was discussed above) with its pixels accessible from server 130.

Again, lenses of cameras 120 have their field-of-views directed to items situated on shelves/displays 110 in accordance with a store planogram. Integration API 140 permits shelf-item monitor 133 to make API calls to planogram services 150 based on a store identifier. Planogram services 150 return a physical layout of the given requested store represented in a data structure, such as table. The layout includes area identifiers, shelf identifiers associated with area identifiers, and item identifiers for items on given shelve identifiers. The area identifiers also map to camera identifiers. It is noted that other types of information may also be included in the layout from planogram service 150.

Shelf-item monitor 133 also uses the store identifier and API 140 to obtain item inventory for items at a given store through inventory system/service 160.

Item identifier 132 and shelf-item monitor 133 are configured with the store's layout (planogram) to identify specific shelves 110 having specific items, camera identifiers, and area identifiers that each camera 120 produces images for. In some cases, item identifiers for given items may also be linked to another data store that includes image templates for a given item image, the templates identify image features for the given item image (such as lines, shape, texture, size, dimension, colors, text, package design, etc.). Shelf-item monitor 133 also retains item inventory for processing during operation of the system 100.

During operation of system 100, cameras 120 capture image frames with the metadata and stream to data store 131. Item identifier 132 processes receives each frame to identify item counts on the shelves 110, empty spaces of missing items on shelves 110, and/or item identification or verification of items on shelves 110 (to identify items placed on wrong shelves 110).

Item identifier 132 can perform pixel analysis of each frame utilizing a number of techniques. For example, known background pixels associated with a background having no shelf or items can be subtracted from each frame. Edge detection and shape processing to separate each individual shelves 110 from one another and to separate each item from other items of the same type or a different type present within each shelf 110. Adjustments to the frames for lightening known to be present in the area of the store associated with the cameras 120 (this may also be based on day of year and time of day based on location of the store to account for natural lightening within the store). Frame averaging and state majority voting can be added to stabilize the filtering of each frame.

Item identifier 132 produces as output an image of a shelf 110 for the frame (or multiple frames when multiple cameras 120 cover a single shelf 120) for a given shelf 110 representing a total item count for the shelf and positions on the shelf 110 that are empty (no pixel values for a given item) and therefore not on the shelf 110.

Item identifier 132 maintains a previous processed output image for comparison with each current processed output. In this way, item identifier 132 can alert shelf-item monitor 133 when shelf item counts decrease and/or when a given shelf 110 is empty entirely. Shelf identifiers and item counts are provided from item identifier 132 to shelf-item monitor 133. Shelf-item monitor 133 uses configurable rules to determine when to send a notification and to whom to provide a given notification. For example, when a soup count for a soup shelf falls below X amount or when soup shelf is Y % empty send a message or alert to notification service 180 using API 140. Notification service 180 knows how to handle the notification and relays it to device's operated by store personnel associated with restocking the soup shelf with soup. In another instance, shelf-item monitor 133 receives an item count for soup and compares against a reported item inventory for soup at the store (through inventory service 160). When the difference falls below a threshold of a given rule for soup, shelf-item monitor 133 uses API and sends a message to inventory services 160 and/or third-party services 190. Should an online customer of third-party service 190 orders a quantity of soup that exceeds the remaining soups in total inventory for the store. Third-party service 190 may notify the online customer before the customer is able to place and pay for the order. Third-party service 190 may also display a warning message to the customer when soup is ordered if the total inventory of soup is within a threshold amount, since soup may be purchased and be out of stock before the third-party shopper is able to obtain soup for the customer. In such a case, third-party service 190 may allow the customer to place the order for soup but also provide backup instructions should soup not be there when the shopper arrives (provide a credit for the price of the soup to customer account or obtain a different item in the store). Upon receiving the message regarding soup inventor from shelf-item monitor 133, inventory services 160 may generate a soup purchase order, place the order with a soup vendor, and record a scheduled date that the soup order is to arrive at the store.

In some cases, real-time item inventories based on the shelf inventory may be continually sent from shelf-item monitor as messages using API 140 to inventory services 160, transaction services 170, notification services 180, and/or third-party services 190. Any of these services 160-190 may include a user-facing dashboard service where item counts of specific items within the store and on specific shelves 110 are streamed in real time. This may be useful to re-stocking staff, inventory staff, third-party services' staff, and/or cashiers within the store.

The above-noted examples are only illustrative and are not intended to limit other embodiments of system 100. That is, system 100 provides a platform for identifying and sending notifications regarding real-time item-shelf inventory for a given store. Consuming services 160-190 can subscribed through integration API 140 for receiving specific types of notifications based on specific rules regarding item shelf inventory at a given store. System 100 can configure item identifier 132 and shelf-item monitor based on a given planogram from a given store provided through planogram service 150.

In an embodiment, third-party service 190 aggregates real-time item shelf inventory reported by two or more stores to automatically decide where to route shoppers/pickers that fulfill online customer orders.

In an embodiment, transaction services 170 aggregates real-time item shelf-inventory reported by two or more stores of a same retailer to automatically instruct retailer staff of one store that a given item is available in store at a different store, such that transaction service's interfaces can be used to have the different store hold the item for a customer at the store where such item is unavailable.

In an embodiment, item identifier 132 uses template information for images of a given item type to identify items located on an incorrect shelf 110 according to a given store layout (planogram). The location of these miss-shelved items within the store can be provided in a report generated by shelf-item monitory 133 at configured intervals of time based on custom rules (such as once an hour, once a day, once every two days, etc.). The list can be sent as a notification message to notification services 180. Notification service 180 may send the list as a report to restock or re-shelving staff within the store. This allows for more efficient use of time of staff; rather than throwing all miss-shelved items in a cart as identified by walking the store and then re-walking the store to re-shelve the items.

In an embodiment, shelf-item monitor 133 may push notifications to services 160-190 based on rules defined through an interface accessible through API 140.

In an embodiment, shelf-item monitory 133 may have notifications pulled by services 160-190 in real time and as requested on demand by services 160-190 through API 140. For example, a manager of a given store may access interfaces of notification services 180 use API 140 are request a current item shelf count for a given item within the store because the manager is expecting a rush on such items because of some external event.

Again, a variety of beneficial scenarios can be processed and provided through system 100 in an easy to integrate manner with a plurality of systems 150-190 with integration API 140.

These and other embodiments are now discussed with reference to FIGS. 2-4.

Figure 2:
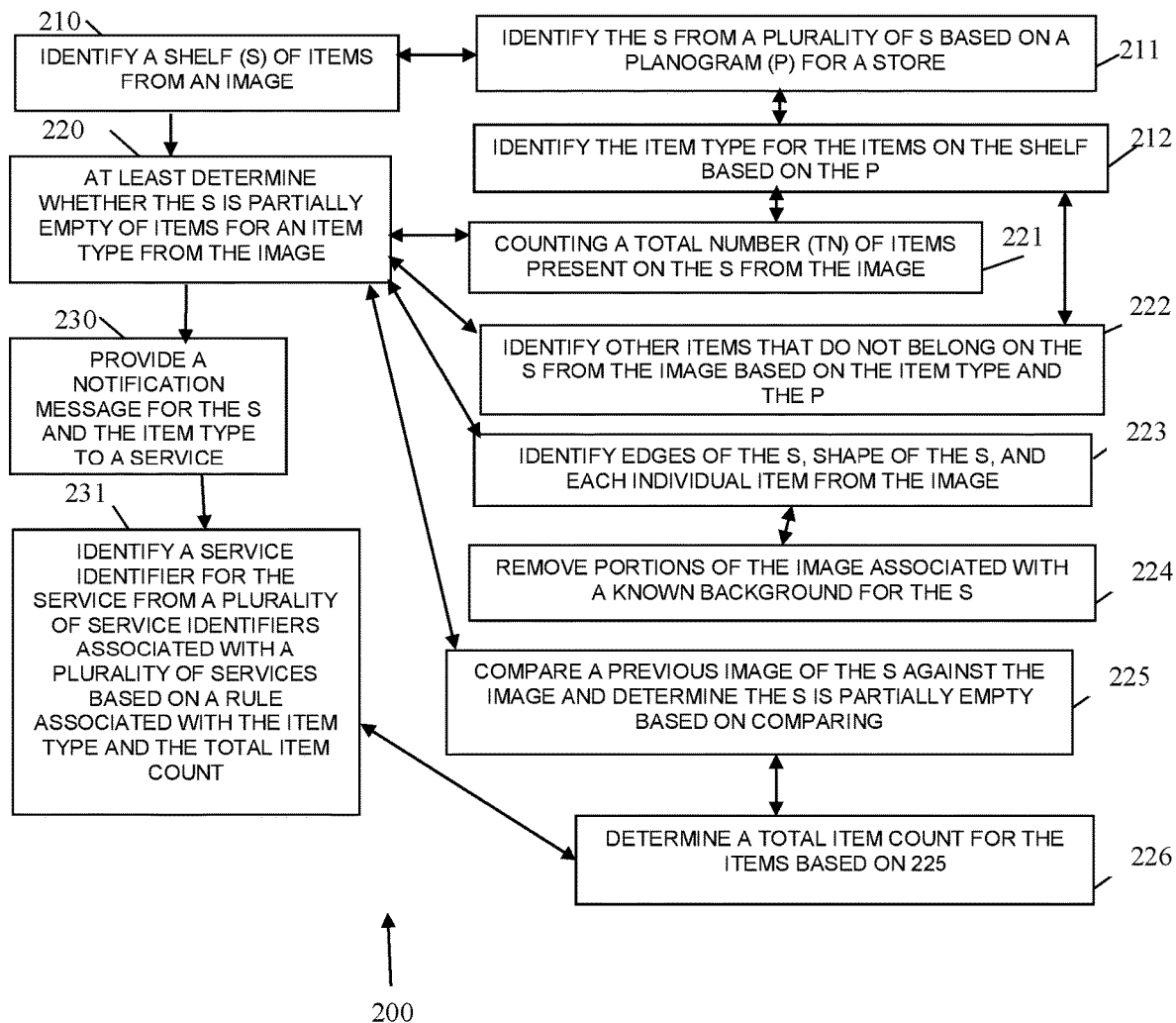
FIG. 2 is a diagram of a method for real-time shelf inventory and notification, according to an example embodiment.

FIG. 2 is a diagram of a method 200 for real-time shelf inventory and notification, according to an example embodiment. The software module(s) that implements the method 200 is referred to as an "item shelf inventory manager." The item shelf inventory manager is implemented as executable instructions programmed and residing within memory and/or a non-transitory computer-readable (processor-readable) storage medium and executed by one or more processors of a device. The processor(s) of the device that executes the item shelf inventory manager are specifically configured and programmed to process the item shelf inventory manager. The item shelf inventory manager has access to one or more network connections during its processing. The network connections can be wired, wireless, or a combination of wired and wireless.

In an embodiment, the device that executes the item shelf inventory manager is the server 130. In an embodiment, the server 130 is located proximate to or on-site of a retail store.

In an embodiment, device that executes the item shelf inventory manager is a cloud-based processing environment associated with a collection of servers. In this embodiment, images captured of shelves and items on shelves are streamed to the cloud-processing environment or a local storage location local to a given store that provides access over a network connection to the could-based processing environment.

In an embodiment, the item shelf inventory manager is all or some combination of: the item identifier 132, shelf-item monitor 133, and/or integration API 140.

At 210, the item shelf inventory manager identifies a shelf of items from an image.

In an embodiment, at 211, the item shelf inventory manager identifies the shelf from a plurality of shelves based on a planogram for a store where the shelf is located. In an embodiment, the planogram is obtained from the planogram service 150 using API 140.

In an embodiment of 211 and at 212, the item shelf inventory manager identifies the item type for the items on the shelf based on the planogram.

At 220, the item shelf inventory manager at least determines whether the shelf is partially empty of items for an item type from the image. A percentage of emptiness or fullness of the shelf for the given type of item may be calculated or derived from the image.

In an embodiment of 212 and 220, at 221, the item shelf inventory manager counts a total number of items present on the shelf from the image.

In an embodiment of 212 and 220, at 222, the item shelf inventory manager identifies other items that do not belong on the shelf from the image based on the item type and the planogram (miss-placed items within the store).

In an embodiment, at 223, the item shelf inventory manager identifies edges, a shape of the shelf, and each individual item from the image.

In an embodiment of 223 and at 224, the item shelf inventory manager remotes portions of the image associated with a known background for the shelf.

In an embodiment, at 225, the item shelf inventory manager compares a previous image of the shelf against the image and determines the shelf is partially empty based on the comparing at 220.

In an embodiment of 225 and at 226, the item shelf inventory manager determines a total item count for the item based on the comparing at 220.

At 230, the item shelf inventory manager provides a notification message for the shelf and the item type to a service.

In an embodiment of 225 and 230, at 231, the item shelf inventory manager identifies a service identifier for the service from a plurality of service identifiers associated with a plurality of services based on a rule associated with the item type and the total item count for the items.

Figure 3:
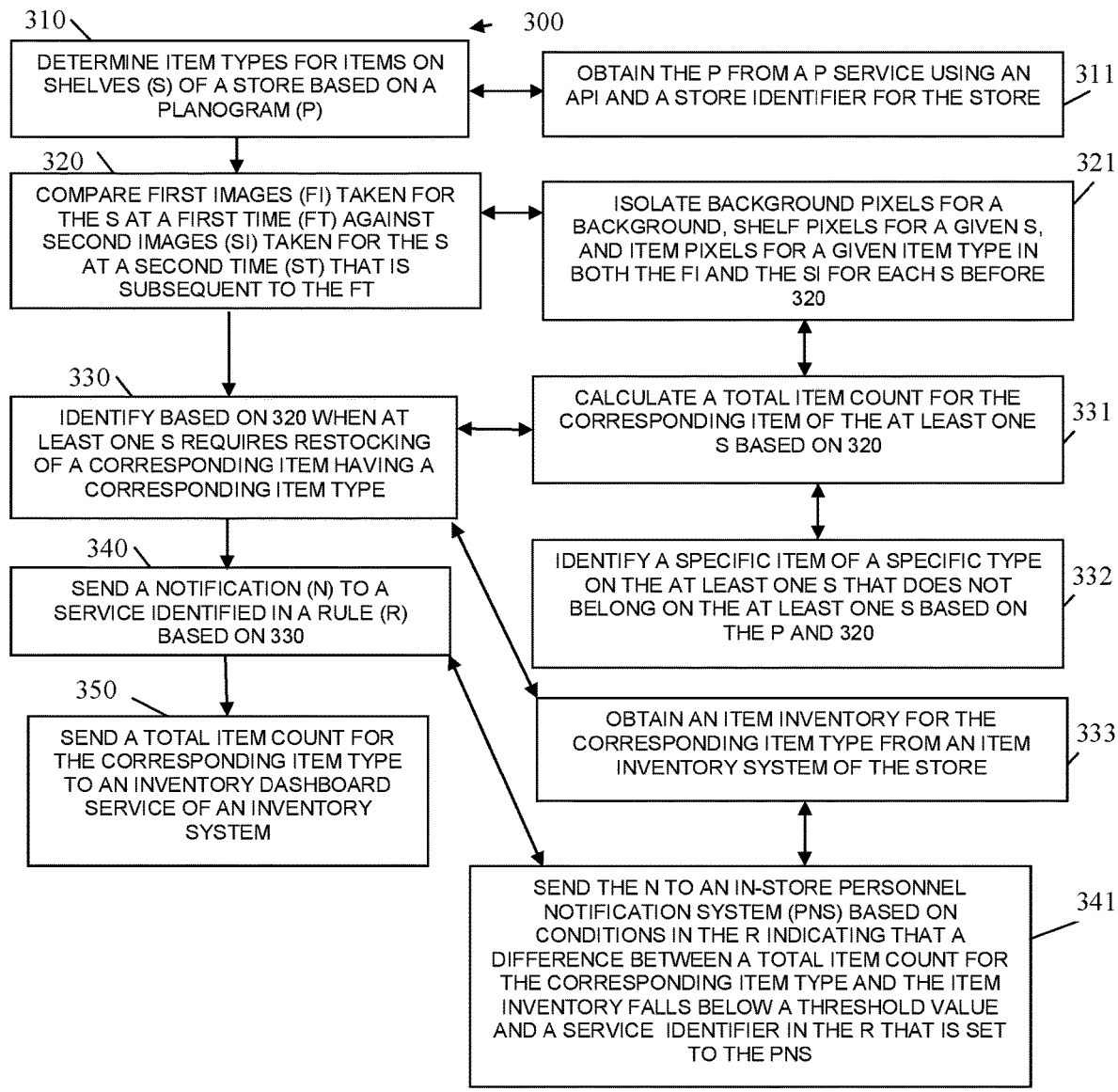
FIG. 3 is a diagram of another method for real-time shelf inventory and notification, according to an example embodiment.

FIG. 3 is a diagram of another method 300 for real-time shelf inventory and notification, according to an example embodiment. The software module(s) that implements the method 300 is referred to as a "real-time item inventory manager." The real-time item inventory manager is implemented as executable instructions programmed and residing within memory and/or a non-transitory computer-readable (processor-readable) storage medium and executed by one or more processors of a device. The processors that execute the real-time item inventory manager are specifically configured and programmed to process the real-time item inventory manager. real-time item inventory manager has access to one or more network connections during its processing.

The network connections can be wired, wireless, or a combination of wired and wireless.

In an embodiment, the device that executes the real-time item inventory manager is the server 130. In an embodiment, the server 130 is a located proximate to or on premises of a given retail store.

In an embodiment, the device that executes the real-time item inventory manager is a cloud-based processing environment associated with a collection of servers. In this embodiment, images captured of shelves and items on shelves are streamed to the cloud-processing environment or a local storage location local to a given store that provides access over a network connection to the could-based processing environment.

In an embodiment, the real-time item inventory manager is all of or some combination of: the item identifier 131, shelf-item monitor 133, and/or the method 200.

The real-time item inventory manager presents another and, in some ways, enhanced processing perspective of the method 200 discussed above.

At 310, the real-time item inventory manager determines item types for items on shelves of a store based on a planogram.

In an embodiment, at 311, the real-time item inventory manager obtains the planogram from planogram service 150 using API 140 and a store identifier for the store.

At 320, the real-time item inventory manager compares first images taken for the shelves at a first time against second images taken for the shelves at a second time that is subsequent to the first time.

In an embodiment, at 321, the real-time item inventory manager isolates background pixels for a background, shelf pixels for a given shelf, and item pixels for a given item type in both the first images and the second images for each shelf before performing the comparing at 320.

At 330, the real-time item inventory manager identify based on 320 when at least one shelf requires restocking of a corresponding item having a corresponding item type.

In an embodiment of 321 and 330, at 331, the real-time item inventory manager calculates a total item count for the corresponding item of the shelf (identified at 330) based on the comparing at 320.

In an embodiment of 331 and at 332, the real-time item inventory manager identifies a specific item of a specific type on the shelf identified at 330 that does not belong on that shelf based on the comparing at 320.

In an embodiment, at 333, the real-time item inventory manager obtains an item inventory for the corresponding item type from item inventory system 160 of the store using API 140.

At 340, the real-time item inventory manager sends a notification to a service identified in a rule based on the identifying at 330 of the shelf requiring restocking.

In an embodiment of 333 and 340, at 341, the real-time item inventory manager sends the notification to an in-store personnel notification system (notification system 180) based on conditions in the rule indicating that a difference between a total item count for the corresponding item type and the item inventory falls below a threshold value and a service identifier in the rule that is set to the in-store personnel notification system (notification system 180).

In an embodiment, at 350, the real-time item inventory manager sends a total item count for the corresponding item type to an inventory dashboard service of an inventory management system 160 or a transaction service/system 170.

Figure 4:
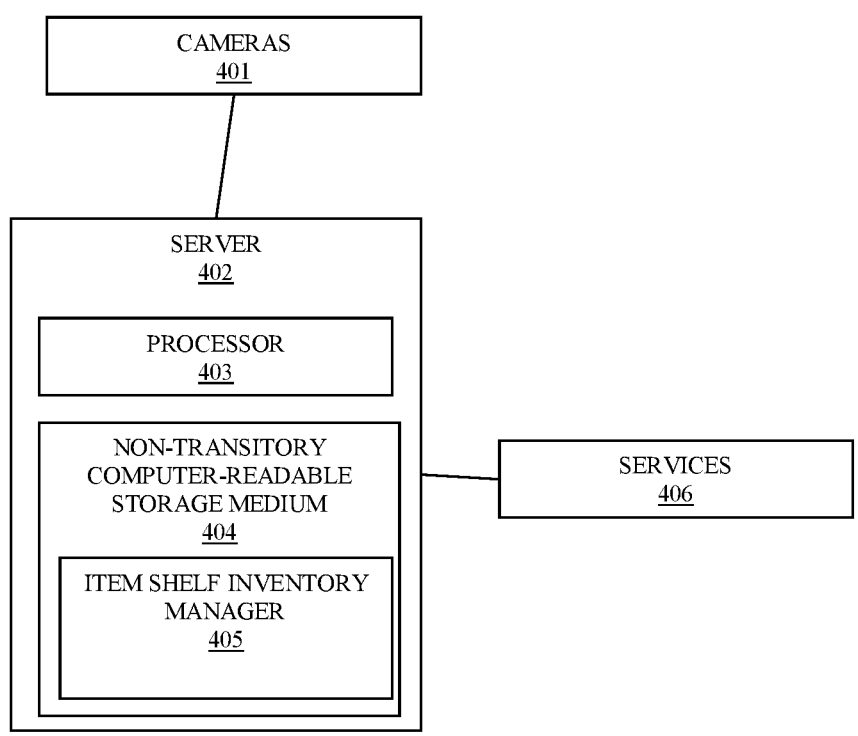
FIG. 4 is a diagram of a system for real-time shelf inventory and notification, according to an example embodiment.

FIG. 4 is a diagram of another system 400 for real-time shelf inventory and notification, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3.

The system 400 includes a plurality of cameras 401, a server 402, and a plurality of services 406. The server 402 includes at least one hardware processor 403 and configured to execute executable instructions from a non-transitory computer-readable storage medium 404 as an item shelf inventory manager 405.

The item shelf inventory manager 405 when executed from the non-transitory computer-readable storage medium 404 on the processor 403 is configured to cause the processor to: 1) determine item inventories for the items present on the shelves from the images based on a planogram for the store; 2) process rules for the item inventories and the shelves; and 3) send notification messages to services based on the rules.

In embodiment, the item shelf inventory manager 405 when executed by the processor 403 from the non-transitory computer-readable storage medium 404 further causes the processor 403 to: 4) determine when a given item that is located on a given shelf is in an incorrect shelf location within the store based on the planogram and the images.

In an embodiment, the item shelf inventory manager 405 is all or some combination of the: item identifier 132, the shelf-item monitor 133, API 140, the method 200, and/or the method 300.

In an embodiment, the server 402 is server 130. In an embodiment server 130, is proximate to or located on premises of a retail store.

In an embodiment, server 402 is one of several servers that cooperate to form a cloud processing environment. The images captured by cameras 401 are accessible to the cloud processing environment local or proximate to the store where the cameras 120 are located.

In an embodiment, the services 406 are: planogram service(s) 150, inventory service(s) 160, transaction service(s) 170, notification service(s) 180, and one or more third-party services 190.

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any traditional terminals or mobile devices.

In an embodiment, the system 400 is deployed in a traditional and non-frictionless store to provide custom item shelf inventory notification and reporting services in the manners discussed herein and above.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a server from a non-transitory computer-readable storage medium causing the processor to perform operations comprising:
maintaining metadata as camera identifiers for cameras, each camera identifier maps to an area identifier within a store, each area identifier further included in a planogram for the store;
receiving and storing a video streamed to cache of the server by given cameras;
maintaining and updating the metadata with image frames depicting shelves of the store with the video in the cache;
identifying a shelf of items from a given image, wherein identifying further includes identifying the given image from the image frames in the cache;
obtaining the corresponding metadata from the given image from the cache, identifying the given camera via a corresponding camera identifier, mapping a corresponding area identifier to the planogram, and obtaining item identifiers for the items and a shelf identifier for the shelf associated with the corresponding area identifier;
determining the shelf is partially empty of the items for an item type from the given image by identifying the item type from the item identifiers for the shelf, obtaining image templates for the items of the item type using the item identifiers, extracting features for the items from the given image, and analyzing the features against template features for the image templates to identify each item on the shelf, wherein determining further includes performing pixel analysis using edge detection and shape processing to distinguish the shelf from other shelves and to separate each of the items from one another within each image frame and adjusting sets of pixels within each image frame associated with each item based on lighting considering the corresponding area identifier associated with the given camera, time of day of a corresponding image frame, and day of year, and using the modified sets of pixels for each item and performing the identifying of the item type and assigning a corresponding item type for a corresponding item, wherein determining further includes comparing a previous image of the shelf against the given image and determining the shelf is partially empty based on the comparing, wherein comparing further includes determining a total item count for the items based on the comparing and determining a percentage of emptiness for the shelf being partially empty using the total item counts; and
providing a notification message for the shelf and the item type to a service using an application programming interface, wherein providing further includes identifying a service identifier for the service from a plurality of service identifiers associated with a plurality of services by evaluating a rule associated with the item type and the total item count.

2. The method of claim 1, wherein identifying further includes identifying the item type for the items on the shelf based on the planogram.

3. The method of claim 2, wherein at least determining further includes counting a total number of items present on the shelf from the given image.

4. The method of claim 2, wherein at least determining further includes identifying other items that do not belong on the shelf from the given image based on the item type and the planogram.

5. The method of claim 1, wherein at least determining further includes identifying edges of the shelf, a shape of the shelf, and each individual item from the given image.

6. The method of claim 5, wherein identifying the edges further includes removing portions of the given image associated with a known background for the shelf.

7. A method, comprising:
providing executable instructions to a processor of a server from a non-transitory computer-readable storage medium causing the processor to perform operations comprising:
maintaining and updating metadata as camera identifiers for cameras, each camera identifier maps to an area identifier within a store, each area identifier further included in a planogram for the store;
maintaining the metadata with image frames captured of shelves of the store;
determining item types for items on the shelves of the store based on the planogram for the store using shelf identifiers for the shelves in the planogram and item identifiers from the items in the planogram, mapping camera identifiers of corresponding metadata within the image frames to corresponding area identifiers to the shelf identifiers of the planogram and obtaining the item identifiers for each shelf identifier, wherein determining further includes performing pixel analysis on image frames using edge detection and shape processing to distinguish the shelves from one another and to separate each of the items from one another within each image frame and adjusting sets of pixels within each image frame associated with each item based on lighting considering a location associated with a corresponding camera that provides the image frames, time of day of a corresponding image frame, and day of year, and using the modified sets of pixels for each item to perform the determining of the item type and assign a corresponding item type for a corresponding item;
comparing first images taken for the shelves at a first time against second images taken for the shelves at a second time that is subsequent to the first time, wherein comparing further includes obtaining the image frames streamed from the corresponding camera into a cache of the server for each of the first images and the second images, and wherein comparing further includes for each first image and for each second image:

isolating background pixels for a background, shelf pixels for a given shelf, and item pixels for a given item type in both the first images and the second images for each shelf before the comparing obtaining image templates for each of the items using the item identifiers, extracting features for the corresponding items from the corresponding images, and analyzing the features against template features for the image templates to identify each item on the shelf;

identifying based on the comparing when at least one shelf requires restocking of a corresponding item having a corresponding item type based on determining a percentage of emptiness for each item of the at least one shelf, wherein identifying further includes calculating a total item count for the corresponding item of the at least one shelf based on the comparing, wherein calculating further includes identifying a specific item of a specific type on the at least one shelf that does not belong on the at least one shelf based on the planogram and the comparing; and sending a notification to a service by evaluating a rule based on the identifying of the at least one shelf and using an application programming interface (API) and a service identifier for the service.

8. The method of claim 7, wherein determining further includes obtaining the planogram from a planogram service using the API and a store identifier for the store.

9. The method of claim 7, wherein identifying further includes obtaining an item inventory for the corresponding item type from an inventory system of the store.

10. The method of claim 9, wherein sending further includes sending the notification to an in-store personnel notification system based on conditions in the rule indicating that a difference between a total item count for the corresponding item type and the item inventory falls below a threshold value and a service identifier in the rule that is sent to the in-store personnel notification system.

11. The method of claim 7 further comprising, sending a total item count for the corresponding item type to an inventory dashboard service of an inventory system.

12. A system, comprising:

cameras configured to capture images of shelves with items located within a store;

a server that includes a processor and a non-transitory computer-readable storage medium having executable instructions representing an item shelf inventory manager; and the item shelf inventory manager when executed by the processor cause the processor to perform operations comprising:

maintaining and updating metadata as camera identifiers for the cameras, each camera identifier maps to an area identifier within the store, each area identifier further included in a planogram for the store;

receiving and managing image frames streamed from the cameras to a cache of the server;

maintaining the metadata with the image frames depicting shelves of the store within the cache;

determining item inventories for the items present on the shelves from the images based on the planogram for the store using the cameras that stream the images in the image frames to the cache of the server, using the camera identifiers and corresponding area identifiers to locate shelf identifiers and item identifiers from the planogram and performing pixel analysis on image frames using edge detection and shape processing to distinguish the shelves from one another and to separate each of the items from one another within each image frame and adjusting sets of pixels within each image frame associated with each item based on lighting considering a location associated with the cameras that provide the image frames, time of day of a corresponding image frame, and day of year, and using the modified sets of pixels for each item to perform item type recognition and assign a corresponding item type for a corresponding item;

processing rules for the item inventories and the shelves, wherein processing further includes obtaining the shelf identifiers for the shelves and the item identifiers for the items, using the item identifiers for each image and obtaining image templates for each of the items based on the assigned item types, extracting features for corresponding items from corresponding images, and analyzing the features against template features for the image templates to identify each item on each of the shelves; and sending notification messages to services by evaluating the rules obtaining service identifiers for the services and sending the notification messages to the services using an application programming interface.

13. The system of claim 12, wherein the item shelf inventory manager is further configured to cause the processor to perform additional operations comprising:

determining when a given item that is located on a given shelf is in an incorrect shelf location within the store based on the planogram and the images.

* * * * *